United States Patent
Song et al.

(10) Patent No.: US 10,827,399 B2
(45) Date of Patent: Nov. 3, 2020

(54) METHOD FOR SWITCHING ROADSIDE NAVIGATION UNIT IN NAVIGATION SYSTEM, AND DEVICE

(71) Applicant: HUAWEI TECHNOLOGIES CO., LTD., Shenzhen, Guangdong (CN)

(72) Inventors: Yonggang Song, Beijing (CN); Hui Li, Shenzhen (CN)

(73) Assignee: HUAWEI TECHNOLOGIES CO., LTD., Shenzhen, Guangdong (CN)

(*) Notice: Subject to any disclaimer, the term of this patent is extended or adjusted under 35 U.S.C. 154(b) by 341 days.

(21) Appl. No.: 15/989,958

(22) Filed: May 25, 2018

(65) Prior Publication Data

US 2018/0279183 A1   Sep. 27, 2018

Related U.S. Application Data

(63) Continuation of application No. PCT/CN2015/095594, filed on Nov. 26, 2015.

(51) Int. Cl.
*H04W 36/00* (2009.01)
*H04W 36/08* (2009.01)
(Continued)

(52) U.S. Cl.
CPC ........ *H04W 36/0061* (2013.01); *G01C 21/28* (2013.01); *G05D 1/0276* (2013.01);
(Continued)

(58) Field of Classification Search
None
See application file for complete search history.

(56) References Cited

U.S. PATENT DOCUMENTS

| 2011/0306353 A1 | 12/2011 | Kim et al. |
| 2012/0146811 A1 | 6/2012 | Chou et al. |

(Continued)

FOREIGN PATENT DOCUMENTS

| CN | 101383745 A | 3/2009 |
| CN | 101932059 A | 12/2010 |

(Continued)

OTHER PUBLICATIONS

Luo Tao: "A position-based handoff scheme in WAVE systems", Wireless Communication over ZigBee for Automotive Inclination Measurement. China Communications, Jan. 31, 2011, pp. 95-101, XP055515118.

(Continued)

*Primary Examiner* — Lail A Kleinman
(74) *Attorney, Agent, or Firm* — Womble Bond Dickinson (US) LLP

(57) ABSTRACT

Embodiments of the present invention provide a method for switching a roadside navigation unit in a navigation system. The method includes: receiving, by an OBU, a switching notification message from a first RSU, where the switching notification message is used to instruct the OBU to prepare to switch a home RSU of the OBU from the first RSU to a second RSU; sending, by the OBU, a registration request to the second RSU to request to obtain local path information of the OBU within a coverage area of the second RSU; receiving, by the OBU, the local path information; and switching, by the OBU, the home RSU of the OBU from the first RSU to the second RSU according to the local path information.

20 Claims, 6 Drawing Sheets

(51) Int. Cl.

| | | |
|---|---|---|
| *G08G 1/0968* | (2006.01) | |
| *G08G 1/0967* | (2006.01) | |
| *G01C 21/28* | (2006.01) | |
| *G05D 1/02* | (2020.01) | |
| *G08G 1/01* | (2006.01) | |

(52) U.S. Cl.
CPC ......... *G08G 1/0112* (2013.01); *G08G 1/0116* (2013.01); *G08G 1/096725* (2013.01); *G08G 1/096741* (2013.01); *G08G 1/096783* (2013.01); *G08G 1/096822* (2013.01); *H04W 36/08* (2013.01); *G05D 2201/0213* (2013.01)

(56) References Cited

U.S. PATENT DOCUMENTS

| | | | |
|---|---|---|---|
| 2013/0079040 A1* | 3/2013 | Charbit ................ | H04W 4/026 455/458 |
| 2013/0115954 A1* | 5/2013 | Charbit ................ | H04W 36/32 455/437 |

FOREIGN PATENT DOCUMENTS

| | | |
|---|---|---|
| CN | 102256322 A | 11/2011 |
| CN | 102802121 A | 11/2012 |
| CN | 103415082 A | 11/2013 |
| CN | 103441847 A | 12/2013 |
| CN | 104637328 A | 5/2015 |
| CN | 104703239 A | 6/2015 |
| CN | 104949684 A | 9/2015 |
| JP | 10-108237 A | 4/1998 |
| JP | 2006309736 A | 11/2006 |
| KR | 20110065262 A | 6/2011 |
| KR | 20110065347 A | 6/2011 |
| KR | 20110107908 A | 10/2011 |
| KR | 20150077671 A | 7/2015 |

OTHER PUBLICATIONS

Ziru Lv, Position Based Handoff Scheme in VANETs. China Master's Theses Full-text Database, vol. 9, Sep. 15, 2011, 64 pages.

Zhan Yuan: "The Research and Design of a RPR-handoff-based WAVE Vehicle Network System", Zhejiang University [Web publishing period] Jul. 2012. with partial English translation. Total 112 pages.

* cited by examiner

METHOD FOR SWITCHING ROADSIDE NAVIGATION UNIT IN NAVIGATION SYSTEM, AND DEVICE

CROSS-REFERENCE TO RELATED APPLICATIONS

This application is a continuation of International Application No. PCT/CN2015/095594, filed on Nov. 26, 2015. the disclosure of which is hereby incorporated by reference in its entirety.

TECHNICAL FIELD

The present invention relates to the communications field and the transportation field, and more specifically, to a method for switching a roadside navigation unit in a navigation system, an onboard unit, and a roadside navigation unit.

BACKGROUND

In recent years, as intelligent transportation technologies rapidly develop, automatic driving based on network communication will become a mainstream and an inevitable trend of future automatic driving, and a roadside navigation unit (RSU) is an extremely crucial device in a self-driving scenario.

In the prior art, an entire network is divided into different areas. In addition to collecting routing request information and a self-driving vehicle location report, an RSU in each area exchanges only vehicle traffic in the area with an RSU in another area to make a routing decision. In this distributed information collection and routing decision-making manner, computing complexity of a navigation algorithm may be reduced, and real-time performance of a navigation system may be improved. However, this solution focuses on a human-oriented application, and cannot deal with RSU navigation and switching in a vehicle self-driving case. In addition, according to this solution, seamless switching and takeover occurring when a self-driving vehicle passes through different RSUs cannot be implemented, and consequently, security of the self-driving vehicle cannot be ensured.

SUMMARY

Embodiments of the present invention provide a method for switching a roadside navigation unit in a navigation system, and a device, so as to implement seamless switching of an RSU. The method and the device are applicable to a large-scale self-driving scenario.

A first aspect provides a method for switching a roadside navigation unit in a navigation system, and the method includes: receiving, by an onboard unit (OBU), a switching notification message sent by a first RSU, where the switching notification message is used to instruct the OBU to prepare to switch a home RSU of the OBU from the first RSU to a second RSU; then sending, by the OBU, a registration request to the second RSU to request to obtain local path information of the OBU within a coverage area of the second RSU; and receiving, by the OBU, the local path information sent by the second RSU, and switching the home RSU of the OBU from the first RSU to the second RSU according to the local path information.

In one embodiment, before the OBU receives the switching notification message sent by the first RSU, the OBU may further send location information of the OBU to the first RSU, and the first RSU may determine, according to the location information of the OBU, whether to enable RSU switching for the OBU, so as to determine whether to send the switching notification message.

In one embodiment, the first switching preprocessing message includes a global path of the OBU and the location information of the OBU.

In one embodiment, before the receiving, by the OBU, a switching notification message sent by the first RSU, the method further includes:

receiving, by the OBU, a second switching preprocessing message sent by the first RSU, where the second switching preprocessing message includes at least one of an identity ID of the second RSU, an address of the second RSU, or a name of the second RSU.

In one embodiment, the sending, by the OBU, a registration request to the second RSU to request to obtain local path information of the OBU within a coverage area of the second RSU includes:

receiving, by the OBU, a registration success message sent by the second RSU;

sending, by the OBU, a local path request to the second RSU according to the registration success message; and receiving, by the OBU, the local path information that is sent by the second RSU and that responds to the local path request.

With reference to the first aspect, in a possible implementation of the first aspect, the receiving, by the OBU, the local path information sent by the second RSU includes:

receiving, by the OBU, the local path information sent by the second RSU when the second RSU determines that the OBU successfully registers.

In one embodiment, the method further includes:

sending, by the OBU, a switching report message to a central service unit (CSU), where the switching report message is used to notify the CSU that the home RSU of the OBU has been switched to the second RSU.

In one embodiment, the method further includes:

sending, by the OBU, a deregistration message to the first RSU, so that the first RSU releases, according to the deregistration message, a resource corresponding to the OBU.

A second aspect provides a method for switching an RSU in a navigation system, and the method includes:

sending, by a first RSU, a first switching preprocessing message to a second RSU, so that the second RSU determines local path information of an onboard unit OBU within a coverage area of the second RSU according to the first switching preprocessing message; and sending, by the first RSU, a switching notification message to the OBU, where the switching notification message is used to instruct the OBU to prepare to switch a home RSU of the OBU from the first RSU to the second RSU, so that the OBU, according to the switching notification message, obtains the local path information from the second RSU and switches the home RSU of the OBU from the first RSU to the second RSU.

In one embodiment, the method further includes:

receiving, by the first RSU, location information of the OBU that is sent by the OBU; and determining, by the first RSU according to the location information of the OBU, whether to enable RSU switching for the OBU, so as to determine whether to send the switching notification message or determine whether to send the first switching preprocessing message.

In one embodiment, the first switching preprocessing message includes a global path of the OBU and the location information of the OBU.

In one embodiment, before the sending, by the first RSU, a switching notification message to the OBU, the method further includes:

sending, by the first RSU, a second switching preprocessing message to the OBU, where the second switching preprocessing message includes at least one of an identity ID of the second RSU, an address of the second RSU, or a name of the second RSU.

In one embodiment, the method further includes:

receiving, by the first RSU, a deregistration message sent by the OBU or the second RSU; and releasing, by the first RSU according to the deregistration message, a resource corresponding to the OBU.

A third aspect provides a method for switching an RSU in a navigation system, and the method includes:

receiving, by a second RSU, a first switching preprocessing message sent by a first RSU;

determining, by the second RSU, local path information of an onboard unit OBU within a coverage area of the second RSU according to the first switching preprocessing message;

receiving, by the second RSU, a registration request that is sent by the OBU and that is used to request to obtain the local path information; and sending, by the second RSU, the local path information to the OBU, so that the OBU switches a home RSU of the OBU from the first RSU to the second RSU according to the local path information.

In one embodiment, the method further includes:

sending, by the second RSU, a registration success message to the OBU; and receiving, by the second RSU, a local path request sent by the OBU according to the registration success message; and the sending, by the second RSU, the local path information to the OBU includes:

sending, by the second RSU to the OBU, the local path information that responds to the local path request.

In one embodiment, the sending, by the second RSU, the local path information to the OBU includes:

sending, by the second RSU, the local path information to the OBU when determining that the OBU successfully registers.

In one embodiment, the first switching preprocessing message includes a global path of the OBU and location information of the OBU; and the determining, by the second RSU, local path information of the OBU within a coverage area of the second RSU according to the first switching preprocessing message includes:

determining, by the second RSU, the local path information of the OBU within the coverage area of the second RSU according to the global path of the OBU and the location information of the OBU.

In one embodiment, the method further includes:

sending, by the second RSU, a switching report message to a CSU, where the switching report message is used to notify the CSU that the home RSU of the OBU has been switched to the second RSU.

In one embodiment, the method further includes:

sending, by the second RSU, a deregistration message to the first RSU, so that the first RSU releases, according to the deregistration message, a resource corresponding to the OBU.

A fourth aspect provides an OBU, including:

a receiving module, configured to receive a switching notification message sent by a first RSU, where the switching notification message is used to instruct the OBU to prepare to switch a home RSU of the OBU from the first RSU to a second RSU;

a sending module, configured to send a registration request to the second RSU to request to obtain local path information of the OBU within a coverage area of the second RSU; where the receiving module is further configured to receive the local path information sent by the second RSU; and a switching module, configured to switch the home RSU of the OBU from the first RSU to the second RSU according to the local path information received by the receiving module.

In one embodiment, the sending module is further configured to send location information of the OBU to the first RSU before the OBU receives the switching notification message sent by the first RSU, where the location information is used by the first RSU to determine whether to enable RSU switching for the OBU, so as to determine whether to send the switching notification message.

In one embodiment, the first switching preprocessing message includes a global path of the OBU and the location information of the OBU.

In one embodiment, the receiving module is further configured to: before the OBU receives the switching notification message sent by the first RSU, receive a second switching preprocessing message sent by the first RSU, where the second switching preprocessing message includes at least one of an identity ID of the second RSU, an address of the second RSU, or a name of the second RSU.

In one embodiment, the sending module is further configured to:

receive a registration success message sent by the second RSU;

send a local path request to the second RSU according to the registration success message; and receive the local path information that is sent by the second RSU and that responds to the local path request.

In one embodiment, the receiving module is configured to:

receive the local path information sent by the second RSU when the second RSU determines that the OBU successfully registers.

In one embodiment, the sending module is further configured to send a switching report message to a CSU, where the switching report message is used to notify the CSU that the home RSU of the OBU has been switched to the second RSU.

In one embodiment, the sending module is further configured to send a deregistration message to the first RSU, so that the first RSU releases, according to the deregistration message, a resource corresponding to the OBU.

A fifth aspect provides an RSU, including:

a sending module, configured to send a first switching preprocessing message to a second RSU, where the first switching preprocessing message is used by the second RSU to determine local path information of an OBU within a coverage area of the second RSU; where the sending module is further configured to send a switching notification message to the OBU, where the switching notification message is used to instruct the OBU to prepare to switch a home RSU of the OBU from the RSU to the second RSU, so that the OBU, according to the switching notification message, obtains the local path information from the second RSU and switches the home RSU of the OBU from the RSU to the second RSU.

In one embodiment, the RSU further includes:

a receiving module, configured to: before the RSU sends the first switching preprocessing message to the second RSU, receive location information of the OBU that is sent by the OBU; and a determining module, configured to determine, according to the location information of the OBU, whether RSU switching is to be enabled for the OBU, so as to determine whether the switching notification message is to be sent or determine whether the first switching preprocessing message is to be sent.

In one embodiment, the first switching preprocessing message includes a global path of the OBU and the location information of the OBU.

In one embodiment, the sending module is further configured to send a second switching preprocessing message to the OBU before the RSU sends the switching notification message to the OBU, where the second switching preprocessing message includes at least one of an identity ID of the second RSU, an address of the second RSU, or a name of the second RSU.

In one embodiment, the receiving module is further configured to receive a deregistration message sent by the OBU or the second RSU; and a deregistration module is configured to release, according to the deregistration message, a resource corresponding to the OBU.

A sixth aspect provides an RSU, including:

a receiving module, configured to receive a first switching preprocessing message sent by a first RSU;

a determining module, configured to determine local path information of an OBU within a coverage area of the RSU according to the first switching preprocessing message; where the receiving module is further configured to receive a registration request that is sent by the OBU and that is used to request to obtain the local path information; and a sending module, configured to send the local path information to the OBU, so that the OBU switches a home RSU of the OBU from the first RSU to the RSU according to the local path information.

In one embodiment, the sending module is configured to send a registration success message to the OBU;

the receiving module is configured to receive a local path request sent by the OBU according to the registration success message; and the sending module is configured to:

send, to the OBU, the local path information that responds to the local path request.

In one embodiment, the sending module is configured to:

send the local path information to the OBU when the OBU successfully registers.

In one embodiment, the first switching preprocessing message includes a global path of the OBU and location information of the OBU; and the determining module is configured to:

determine the local path information of the OBU within the coverage area of the second RSU according to the global path of the OBU and the location information of the OBU.

In one embodiment, the sending module is further configured to send a switching report message to a CSU, where the switching report message is used to notify the CSU that the home RSU of the OBU has been switched to the RSU.

In one embodiment, the sending module is further configured to send a deregistration message to the first RSU, so that the first RSU releases, according to the deregistration message, a resource corresponding to the OBU.

A seventh aspect provides a system, including the OBU according to the fourth aspect, the RSU according to the fifth aspect, and the RSU according to the sixth aspect.

An eighth aspect provides an OBU in a navigation system, including a processor and a memory, where the memory stores a program, and the processor performs the program to perform the method for switching an RSU in a navigation system according to any one of the first aspect, or the possible implementations of the first aspect.

A ninth aspect provides an RSU in a navigation system, including a processor and a memory, where the memory stores a program, and the processor performs the program to perform the method for switching a roadside navigation unit RSU in a navigation system according to any one of the second aspect, or the possible implementations of the second aspect.

A tenth aspect provides an RSU in a navigation system, including a processor and a memory, where the memory stores a program, and the processor performs the program to perform the method for switching an RSU in a navigation system according to any one of the third aspect, or the possible implementations of the third aspect.

Based on the foregoing technical solutions, in the embodiments of the present invention, a second RSU determines local path information of an OBU within a coverage area of the second RSU according to a first switching preprocessing message sent by a first RSU, and the OBU switches a home RSU of the OBU from the first RSU to the second RSU according to the local path information sent by the second RSU, so that the OBU can implement seamless switching of an RSU by means of negotiation between the first RSU and the second RSU, and driving security of a self-driving vehicle is accordingly ensured.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

Figure 1:
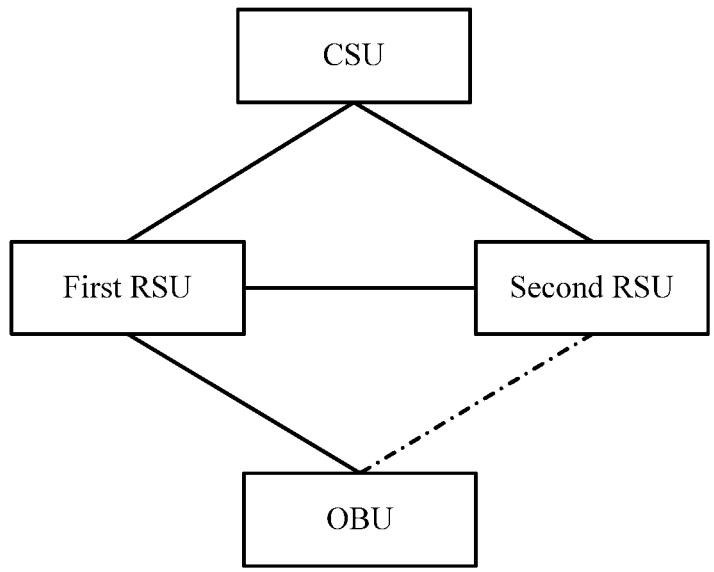
FIG. 1 is an example of a navigation system architecture according to an embodiment of the present invention.

FIG. 1 is an example of a navigation system architecture according to an embodiment of the present invention. Network control-based intelligent transportation shown in FIG. 1 mainly relates to three layers: a CSU, an RSU, and an OBU. Function division of the three layers is mainly as follows:

The CSU is responsible for global path planning. A global path is a unidirectional driving route from a start point to an end point. The start point is usually a current location of a vehicle, and the end point is specified by a passenger according to a requirement. The global path planning is to find a shortest path. The "shortest path" herein means that the path is the shortest in distance, or may mean that the path takes least time or minimum costs, or the like. This is determined according to different requirements. In addition, precision of the global path needs to be at a road level. When performing the global path planning, the CSU needs to consider dynamic road condition information of an entire road network to perform intelligent analysis and comprehensive scheduling. In a transportation system, there is only one CSU. The CSU needs to have extremely high processing performance and reliability, so that in most fault and disaster scenarios, service continuity can be ensured, and accordingly, a navigation service is not interrupted.

The RSU is responsible for local path planning. A local path is a detailed driving route, in a process in which a vehicle travels along a global path, on a relatively short route from a location of the vehicle to the front. A range of the local path is within a coverage area of the RSU. The local path planning is to select a proper lane. Precision of the local path needs to be at a lane level. When performing the local path planning, the RSU needs to consider a lane attribute, a load status of each lane, and a destination direction of a self-driving vehicle in the area, to perform self-driving vehicle scheduling and control in a local area, so as to balance lane load and improve traffic efficiency and quality of a self-driving vehicle (vehicle speed control or less stop). The RSU needs to be deployed along a roadside. Therefore, in a transportation system, there are multiple RSUs, and the RSUs also need to have enough processing performance and relatively high reliability according to a service processing requirement.

The OBU is responsible for autonomous path planning of a self-driving vehicle. An autonomous path is a temporary path that is planned by the self-driving vehicle without depending on path planning performed by the CSU and the RSU. The autonomous path planning is an emergency path adjustment such as emergency obstacle avoidance performed by the self-driving vehicle for a surrounding emergency or a simple decision-making scenario. In addition, precision of the autonomous path needs to be at a lane level. When performing the autonomous path planning, the OBU needs to comprehensively consider surrounding information perceived by the self-driving vehicle, quickly make a decision, and select an emergency path while ensuring security.

In this embodiment of the present invention, the OBU in the navigation system architecture may be integrated into a self-driving vehicle.

The CSU, as a control center of the entire road network, masters global information. An entire transportation map may be divided into multiple areas, and each area is managed by an RSU. An area managed by one RSU is connected to another or more areas managed by another or more RSUs. Each RSU may know a topology relationship of all adjacent RSUs centered on the RSU, and a border area between the adjacent RSUs (that is, an overlapped area of coverage areas of the adjacent RSUs). If a first RSU has multiple adjacent RSUs, a specific RSU that is to be used as a switching target can be specifically determined according to a global path. In this embodiment of the present invention, the first RSU is adjacent to a second RSU, and the second RSU is a switching target to which a home RSU of the OBU is to be switched.

Figure 2:
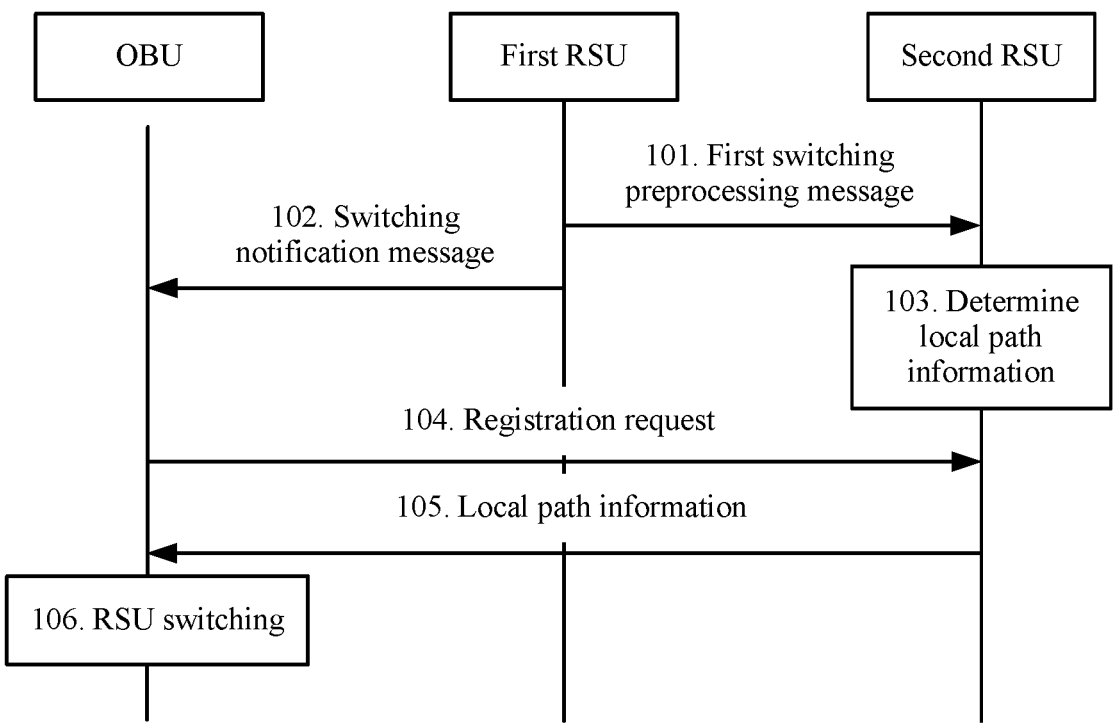
FIG. 2 is a schematic flowchart of a method for switching a roadside navigation unit in a navigation system according to an embodiment of the present invention.

FIG. 2 is a flowchart of a method 100 for switching a roadside navigation unit in a navigation system according to an embodiment of the present invention. S101 to S106 in FIG. 2 are a procedure that needs to be performed to implement the method 100 for switching a roadside navigation unit in a navigation system in this embodiment of the present invention. The following describes each operation in the method 100 in detail.

S101. A first RSU sends a first switching preprocessing message to a second RSU.

In one embodiment, when the first RSU determines that a distance from an OBU to a border of a coverage area of the second RSU is a first distance threshold, that is, the OBU approaches a border area, the first RSU enables switching processing, and sends the first switching preprocessing message to the second RSU.

There is an overlapped area (which is indicated as a "border area") between a coverage area of the first RSU and that of the second RSU, that is, a self-driving vehicle path determined by the first RSU and that determined by the adjacent second RSU partially overlap. When a self-driving vehicle approaches the border area, the first RSU and the second RSU perform communication negotiation to ensure that seamless switching of an RSU can be implemented when the self-driving vehicle enters the border area.

It should be understood that, the first RSU may detect by itself current location information of a corresponding self-driving vehicle, or obtain current location information of a corresponding self-driving vehicle by using another detection apparatus. This is not limited in the present invention.

It should be further understood that herein, it may be preset that triggering the first OBU to send the first switching preprocessing message to the second RSU is started when the self-driving vehicle is at a specific distance from the border area of the second RSU, that is, for setting of the first distance threshold, a specific value or range may be preset during specific implementation. For example, it may be preset that switching processing is enabled when the first RSU detects that a distance from the self-driving vehicle to the border of the coverage area of the second RSU is less than 30 m, or that switching processing is enabled when a distance from the self-driving vehicle to the border of the coverage area of the second RSU is accurate to a determined value 30 m. This is not limited in the present invention.

Optionally, the first switching preprocessing message includes a global path of the OBU and location information of the OBU.

In one embodiment, when determining that the OBU needs to enable switching processing, the first RSU sends the first switching preprocessing message to the second RSU. The first switching preprocessing message includes the global path of the OBU, the location information of the OBU, and the like. According to the global path of the OBU and the location information of the OBU, local path information of the OBU within the coverage area range of the second RSU may be determined in advance, or a preparation may be made in advance to determine local path information of the OBU within a range of the second RSU, and work such as related resource allocation may be made in advance.

In this embodiment of the present invention, the first switching preprocessing message may further carry information such as authentication information of the OBU on the first RSU, a lane attribute, a load status of each lane, and a destination direction of a self-driving vehicle, so that the second RSU can formulate new local path information for the self-driving vehicle according to the first switching preprocessing message, so as to balance lane load and improve traffic efficiency and quality of the self-driving vehicle, for example, vehicle speed control or less stop. This is not limited in the present invention.

S102. The first RSU sends a switching notification message to an OBU, where the switching notification message is used to instruct the OBU to prepare to switch a home RSU of the OBU from the first RSU to the second RSU.

In one embodiment, the first RSU sends the switching notification message to the OBU when the first RSU determines that the distance from the OBU to the border of the coverage area of the second RSU is a second distance threshold (the second distance threshold is less than the first distance threshold), that is, the OBU travels into the border area. The switching notification message may carry information about the second RSU, for example, an identifier (ID) of the second RSU, an address of the second RSU, and a name of the second RSU, so as to instruct the OBU to switch the home RSU of the OBU from the first RSU to the second RSU.

S103. The second RSU determines local path information of the OBU within a coverage area of the second RSU according to the first switching preprocessing message.

In one embodiment, the second RSU receives the first switching preprocessing message sent by the first RSU, and the second RSU can determine the local path information of the OBU within the coverage area of the second RSU according to the first switching preprocessing message (for example, the global path of the OBU and the location information of the OBU). That is, a local path within the range of the second RSU is formulated for the OBU based on negotiation between the first RSU and the second RSU, so as to implement seamless switching of the RSU to which the OBU belongs.

In this embodiment of the present invention, the RSU may be considered as a computer system. When a new self-driving vehicle enters the coverage area of the second RSU, the second RSU needs to be responsible for controlling and managing the self-driving vehicle, that is, the second RSU needs to allocate a corresponding computing resource, memory resource, storage resource, and the like to the self-driving vehicle.

S104. After receiving the switching notification message sent by the first RSU, the OBU sends a registration request to the second RSU to request to obtain the local path information of the OBU within the coverage area of the second RSU.

In one embodiment, the switching notification message may trigger the OBU to send the registration request to the second RSU, so that the OBU can obtain the local path information that is within the coverage area of the second RSU and determined by the second RSU for the OBU.

S105. The second RSU sends the determined local path information to the OBU according to the registration request sent by the OBU.

In one embodiment, the second RSU receives the registration request sent by the OBU, and may send the determined local path information to the OBU when the second RSU determines that the OBU successfully registers with the second RSU.

In this embodiment of the present invention, optionally, that the OBU sends a registration request to the second RSU to request to obtain the local path information of the OBU within the coverage area of the second RSU includes:
receiving, by the OBU, a registration success message sent by the second RSU;
sending, by the OBU, a local path request to the second RSU according to the registration success message; and
receiving, by the OBU, the local path information that is sent by the second RSU and that responds to the local path request.

In one embodiment, after receiving the switching notification message sent by the first RSU, the OBU sends the registration request to the second RSU. The registration request may include identification information of the OBU. For example, the identification information may be an identity number, a subscriber identity module, or the like of a self-driving vehicle. The second RSU performs authentication processing according to the identification information. When it is confirmed that the OBU is an authorized user, it indicates that the OBU successfully registers with the second RSU. In this case, the second RSU may send the registration success message to the OBU. After receiving the registration success message, the OBU sends the local path request to the second RSU, that is, the registration success message may trigger the second RSU to send the local path request to the OBU. In this way, the second RSU sends, to the OBU, the local path information that is of the OBU within the coverage area of the second RSU and that responds to the local path request. The local path information may be determined in advance by using the first switching preprocessing message sent by the first RSU, or may be determined after the second RSU receives the registration request sent by the OBU. The OBU receives the local path information sent by the second RSU, and switches the home RSU of the OBU from the first RSU to the second RSU according to the local path information.

In this embodiment of the present invention, the local path request may be used for triggering, that is, triggering the second RSU to send, to the OBU, the local path information that is of the OBU within the coverage area of the second RSU and that is determined by the second RSU according to the first switching preprocessing message. However, the local path request may further carry current location information or a path planning policy of the self-driving vehicle, a current self-driving vehicle load status of a road, and the like, so that the second RSU can redetermine local path information of the OBU within the coverage area of the second RSU according to the local path request and the first switching preprocessing message. This is not limited in the present invention.

In this embodiment of the present invention, optionally, that the OBU receives the local path information sent by the second RSU includes:

receiving, by the OBU, the local path information sent by the second RSU when the second RSU determines that the OBU successfully registers.

Specifically, in another embodiment of the present invention, after receiving the switching notification message sent by the first RSU, the OBU sends the registration request to the second RSU. The registration request may include identification information of the OBU. For example, the identification information may be an identity number, a subscriber identity module, or the like of a self-driving vehicle. The second RSU performs authentication processing according to the identification information. When it is confirmed that the OBU is an authorized user, it indicates that the OBU successfully registers with the second RSU. In this case, the second RSU may directly send the local path information to the OBU. The local path information may be determined in advance by using the first switching preprocessing message sent by the first RSU, or may be determined after the second RSU receives the registration request sent by the OBU. The OBU receives the local path information, and switches the home RSU of the OBU from the first RSU to the second RSU according to the local path information. In this way, the OBU does not need to actively apply to the second RSU for the local path information. Therefore, resource overheads are reduced.

S106. The OBU switches the home RSU of the OBU from the first RSU to the second RSU according to the local path information.

In one embodiment, after the OBU switches the home RSU of the OBU to the second RSU, the OBU stops executing an original path (that is, a path planned by the first RSU), and travels according to new local path information planned by the second RSU. In addition, this action is instantly completed without time interruption. That is, seamless switching of an RSU is implemented, and safe traveling of a self-driving vehicle is accordingly ensured.

It should be understood that, the OBU only serves as an execution entity for performing RSU switching and only needs to perform corresponding switching according to an instruction of an RSU, and the OBU may not need to know a coverage area of the RSU and may not need to autonomously determine whether to perform RSU switching.

Therefore, according to the method for switching a roadside navigation unit in a navigation system in this embodiment of the present invention, a second RSU determines local path information of an OBU within a coverage area of the second RSU according to a first switching preprocessing message sent by a first RSU, and the OBU switches a home RSU of the OBU from the first RSU to the second RSU according to the local path information sent by the second RSU, so that the OBU can implement seamless switching of an RSU by means of negotiation between the first RSU and the second RSU, and driving security of a self-driving vehicle is accordingly ensured.

According to the method for switching a roadside navigation unit in a navigation system in this embodiment of the present invention, the seamless switching of the RSU can be completed by means of negotiation between the first RSU and the second RSU, and lane-level path planning in an entire journey can be implemented based on the seamless switching of the RSU. Therefore, design of a CSU and that of the RSU are simplified and running burden on the CSU and that on the RSU are alleviated.

Optionally, in this embodiment of the present invention, the method further includes:

sending, by the OBU, location information of the OBU to the first RSU, the location information is used by the first RSU to determine whether to enable RSU switching for the OBU, so as to determine whether to send the switching notification message or determine whether to send the first switching preprocessing message.

In one embodiment, the OBU regularly reports information about the OBU (that is, the location information) to the first RSU, so that the first RSU can determine a distance from the OBU to the border of the coverage area of the second RSU according to the location information of the OBU, so as to determine whether to enable RSU switching. The first RSU sends the first switching preprocessing message to the second RSU when determining that the distance from the OBU to the border of the coverage area of the second RSU is a first distance threshold, that is, the OBU approaches the border area. The first RSU sends the switching notification message to the OBU when the first RSU determines that the distance from the OBU to the border of the coverage area of the second RSU is a second distance threshold (the second distance threshold is less than the first distance threshold), that is, the OBU travels into the border area. The OBU may further add a current speed, a traveling direction, or the like of the self-driving vehicle to the location information of the OBU according to a requirement. This is not limited in the present invention.

In this embodiment of the present invention, after the OBU switches the home RSU of the OBU from the first RSU to the second RSU, the OBU also periodically reports the location information of the OBU to the second RSU, so that seamless switching is implemented according to the location information of the OBU when the OBU travels into a coverage area of a next RSU, that is, a third RSU.

It should be understood that, the OBU also regularly sends the location information of the OBU to the CSU, for example, may forward the location information of the OBU to the CSU by using the first RSU. There is no interface for performing direct communication between the OBU and the CSU in this embodiment of the present invention. However, in actual application deployment, the CSU and the OBU may directly communicate with each other, that is, the OBU may directly send the location information of the OBU to the CSU. This is not limited in the present invention.

Optionally, in this embodiment of the present invention, before the OBU receives the switching notification message sent by the first RSU, the method further includes:

receiving, by the OBU, a second switching preprocessing message sent by the first RSU, where the second switching preprocessing message includes at least one of an identity ID of the second RSU, an address of the second RSU, or a name of the second RSU.

In one embodiment, when the distance from the OBU to the border of the coverage area of the second RSU is the first distance threshold, that is, the self-driving vehicle approaches the border area, the first RSU enables switching processing, and sends the second switching preprocessing message to the OBU. The OBU receives the second switching preprocessing message sent by the first RSU. The second switching preprocessing massage includes information about the second RSU, for example, at least one of the identifier (ID) of the second RSU, the address of the second RSU, or the name of the second RSU. The OBU can learn, in advance according to at least one of the identity ID of the second RSU, the address of the second RSU, or the name of the second RSU, that the home RSU of the OBU is to be switched to the second RSU.

In this embodiment of the present invention, when the OBU receives the second switching preprocessing message that is sent by the first RSU and that carries the information about the second RSU, the switching notification message sent by the first RSU to the OBU may not carry the information about the second RSU. In this case, the switching notification message may be used only to trigger the OBU to send the registration request to the second RSU. This is not limited in the present invention.

It should be understood that, when determining to enable switching processing, the first RSU sends the first switching preprocessing message to the second RSU, and sends the second switching preprocessing message to the OBU at the same time; or may first send a first switching preprocessing message to the second RSU, and then send a second switching preprocessing message to the OBU; or first sends a second switching preprocessing message to the OBU, and then sends a first switching preprocessing message to the second RSU. This is not limited in the present invention.

In this embodiment of the present invention, optionally, the method further includes:

sending, by the OBU, a switching report message to a central service unit CSU, where the switching report message is used to notify the CSU that the home RSU of the OBU has been switched to the second RSU.

In one embodiment, the navigation system further includes a CSU. The CSU is responsible for global path planning. After switching the home RSU of the OBU from the first RSU to the second RSU, the OBU sends the switching report message to the CSU to notify the CSU that the OBU has switched the home RSU of the OBU to the second RSU.

It should be understood that the OBU may send the switching report message to the CSU by forwarding the switching report message by using the home RSU of the OBU, that is, the OBU first sends information to the second RSU to which the OBU belongs, and then the second RSU sends the information to the CSU. There is no interface for performing direct communication between the OBU and the CSU in this embodiment of the present invention. However, in actual application deployment, the CSU and the OBU may directly communicate with each other, that is, the OBU may directly send the switching report message to the CSU. This is not limited in the present invention.

Optionally, in this embodiment of the present invention, the method further includes:

sending, by the second RSU, a switching report message to the CSU, where the switching report message is used to notify the CSU that the home RSU of the OBU has been switched to the second RSU.

In one embodiment, the RSU may be considered as a computer system. When a new self-driving vehicle enters the coverage area of the second RSU, the second RSU needs to be responsible for controlling and managing the self-driving vehicle. Therefore, when the OBU switches the home RSU of the OBU to the second RSU, the second RSU starts to take over the OBU, and sends the switching report message to the CSU to notify the CSU that the OBU has switched the home RSU of the OBU to the second RSU.

In this embodiment of the present invention, the CSU hardly participates in an RSU switching process. Therefore, when a large quantity of self-driving vehicles frequently perform an RSU switching operation, burden on the CSU can be greatly alleviated.

In this embodiment of the present invention, optionally, the method further includes:

sending, by the OBU, a deregistration message to the first RSU, so that the first RSU releases, according to the deregistration message, a resource corresponding to the OBU.

In one embodiment, after switching the home RSU of the OBU to the second RSU, the OBU actively sends the deregistration message to the first RSU, so that the first RSU releases, according to the deregistration message, the resource corresponding to the OBU, that is, releases the resource corresponding to the OBU and control over the OBU.

It should be understood that, after switching the home RSU of the OBU from the first RSU to the second RSU, the OBU may first send the deregistration message to the first RSU, so that the first RSU releases, according to the deregistration message, the resource corresponding to the OBU; or may first send the switching report message to the CSU to notify the CSU that the OBU has switched the home RSU of the OBU to the second RSU; or may send the deregistration message to the first RSU and send the switching report message to the CSU at the same time. This is not limited in the present invention.

In this embodiment of the present invention, optionally, the method further includes:

sending, by the second RSU, a deregistration message to the first RSU, so that the first RSU releases, according to the deregistration message, a resource corresponding to the OBU.

In one embodiment, when the second RSU starts to take over the OBU, it indicates that the OBU has switched the home RSU of the OBU to the second RSU. In this case, the second RSU sends the deregistration message to the first RSU, so that the first RSU releases, according to the deregistration message, the resource corresponding to the OBU, that is, releases the resource corresponding to the OBU and control over the OBU.

It should be understood that, after determining that the OBU switches the home RSU of the OBU from the first RSU to the second RSU, the second RSU may first send the deregistration message to the first RSU, so that the first RSU releases, according to the deregistration message, the resource corresponding to the OBU; or may first send the switching report message to the CSU to notify the CSU that the OBU has switched the home RSU of the OBU to the second RSU; or may send the deregistration message to the first RSU and send the switching report message to the CSU at the same time. This is not limited in the present invention.

The OBU can belong to only one RSU at a same moment. After the OBU successfully registers with the second RSU and before the first RSU receives the deregistration message, the OBU actually has two RSUs with which the OBU registers, and the OBU supports, in this short time, the two RSUs with which the OBU registers. However, before switching the home RSU of the OBU to the second RSU, the OBU still executes the path planned by the first RSU. After switching the home RSU of the OBU to the second RSU, the OBU travels according to the path planned by the second RSU. That is, the OBU can finally have only one home RSU.

Therefore, according to the method for switching a roadside navigation unit in a navigation system in this embodiment of the present invention, a second RSU determines local path information of an OBU within a coverage area of the second RSU according to a first switching preprocessing message sent by a first RSU, and the OBU switches a home RSU of the OBU from the first RSU to the second RSU according to the local path information sent by the second RSU, so that the OBU can implement seamless switching of an RSU by means of negotiation between the first RSU and the second RSU, and driving security of a self-driving vehicle is accordingly ensured.

According to the method for switching a roadside navigation unit in a navigation system in this embodiment of the present invention, the seamless switching of the RSU can be completed by means of negotiation between the first RSU and the second RSU, and lane-level path planning in an entire journey can be implemented based on the seamless switching of the RSU. Therefore, design of a CSU and that of the RSU are simplified and running burden on the CSU and that on the RSU are alleviated.

It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

Figure 3:
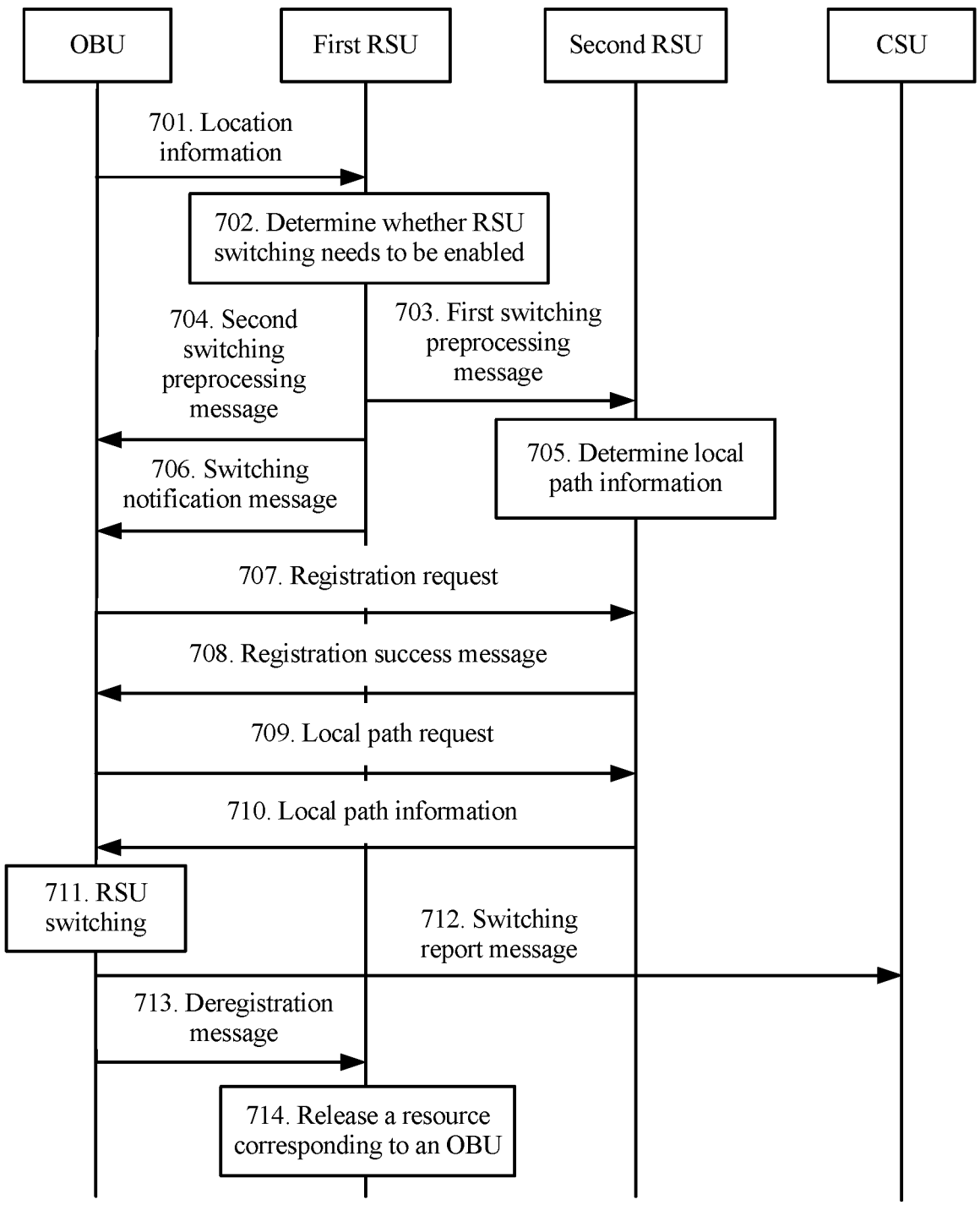
FIG. 3 is a schematic diagram of an interaction procedure of a method for switching a roadside navigation unit in a navigation system according to an embodiment of the present invention.

The following describes the embodiments of the present invention in detail with reference to FIG. 3. It should be noted that this is merely intended to help a person skilled in the art to better understand the embodiments of the present invention, but is not intended to limit the scope of the embodiments of the present invention.

In an embodiment of the present invention, an OBU regularly reports location information to a first RSU, so that the first RSU determines a distance from the OBU to a border of a coverage area of a second RSU according to the location information of the OBU, so as to determine whether to enable RSU switching. When the first RSU determines that the OBU approaches a border area, the first RSU enables switching processing, and sends a first switching preprocessing message to the second RSU, so that the second RSU determines the local path information of the OBU within the coverage area of the second RSU according to the first switching preprocessing message. When the first RSU determines that the OBU enters the border area, the first RSU sends a switching notification message to the OBU, so that the OBU sends a registration request to the second RSU. The second RSU sends a registration success message to the OBU when determining that the OBU successfully registers with the second RSU. After receiving the registration success message, the OBU sends a local path request to the second RSU, so that the second RSU sends the local path information of the OBU within the coverage area of the second RSU to the OBU. The OBU receives the local path information sent by the second RSU, and switches a home RSU of the OBU from the first RSU to the second RSU according to the local path information. After switching the home RSU of the OBU from the first RSU to the second RSU, the OBU sends a switching report message to a CSU to notify the CSU that the OBU has switched the home RSU of the OBU to the second RSU. In addition, after the OBU switches the home RSU of the OBU to the second RSU, the OBU sends a deregistration message to the first RSU, so that after receiving the deregistration message, the first RSU releases a resource corresponding to the OBU.

FIG. 3 is a schematic diagram of an interaction procedure of a method for switching a roadside navigation unit in a navigation system according to an embodiment of the present invention. Meanings of various terms in this embodiment of the present invention are the same as those in the foregoing embodiments.

701. An OBU sends location information of the OBU to a first RSU.

702. The first RSU determines, according to the location information of the OBU, whether the OBU needs to enable RSU switching processing.

The first RSU first determines a distance from the OBU to a border of a coverage area of a second RSU according to the location information of the OBU, so as to determine whether to enable RSU switching.

703. The first RSU sends a first switching preprocessing message to a second RSU, where the first switching preprocessing message includes a global path of the OBU and the location information of the OBU.

704. The first RSU sends a second switching preprocessing message to the OBU, where the second switching preprocessing message includes at least one of an identity ID of the second RSU, an address of the second RSU, or a name of the second RSU.

When determining to enable switching processing, the first RSU sends the first switching preprocessing message to the second RSU, and sends the second switching preprocessing message to the OBU at the same time; or may first send a first switching preprocessing message to the second RSU, and then send a second switching preprocessing message to the OBU; or first sends a second switching preprocessing message to the OBU, and then sends a first switching preprocessing message to the second RSU.

705. The second RSU determines local path information of the OBU within a coverage area of the second RSU according to the first switching preprocessing message.

706. The first RSU determines a distance from the OBU to a border of the coverage area of the second RSU according to the location information of the OBU, and when the OBU travels into a border area, the first RSU sends a switching notification message to the OBU.

707. After receiving the switching notification message, the OBU sends a registration request to the second RSU.

708. The second RSU sends a registration success message to the OBU when determining that the OBU successfully registers.

709. After receiving the registration success message, the OBU sends a local path request to the second RSU to request to obtain the local path information of the OBU within the coverage area of the second RSU.

710. The OBU receives the local path information that is sent by the second RSU and that responds to the local path request.

711. The OBU switches a home RSU of the OBU from the first RSU to the second RSU according to the local path information.

712. The OBU sends a switching report message to a central service unit CSU, where the switching report message is used to notify the CSU that the home RSU of the OBU has been switched to the second RSU.

713. The OBU sends a deregistration message to the first RSU.

After switching the home RSU of the OBU from the first RSU to the second RSU, the OBU may first send the deregistration message to the first RSU, or may first send the switching report message to the CSU, or may send the deregistration message to the first RSU and send the switching report message to the CSU at the same time.

714. The first RSU releases, according to the deregistration message, a resource corresponding to the OBU.

It should be understood that, for a specific indication manner of the foregoing corresponding information, refer to the foregoing embodiments. For brevity, details are not described herein again.

Therefore, according to the method for switching a roadside navigation unit in a navigation system in this embodiment of the present invention, a second RSU determines local path information of an OBU within a coverage area of the second RSU according to a first switching preprocessing message sent by a first RSU, and the OBU switches a home RSU of the OBU from the first RSU to the second RSU according to the local path information sent by the second RSU, so that the OBU can implement seamless switching of an RSU based on negotiation between the first RSU and the second RSU, and driving security of a self-driving vehicle is accordingly ensured.

According to the method for switching a roadside navigation unit in a navigation system in this embodiment of the present invention, the seamless switching of the RSU can be completed by means of negotiation between the first RSU and the second RSU, and lane-level path planning in an entire journey can be implemented based on the seamless switching of the RSU. Therefore, design of a CSU and that of the RSU are simplified and running burden on the CSU and that on the RSU are alleviated.

It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

Figure 4:
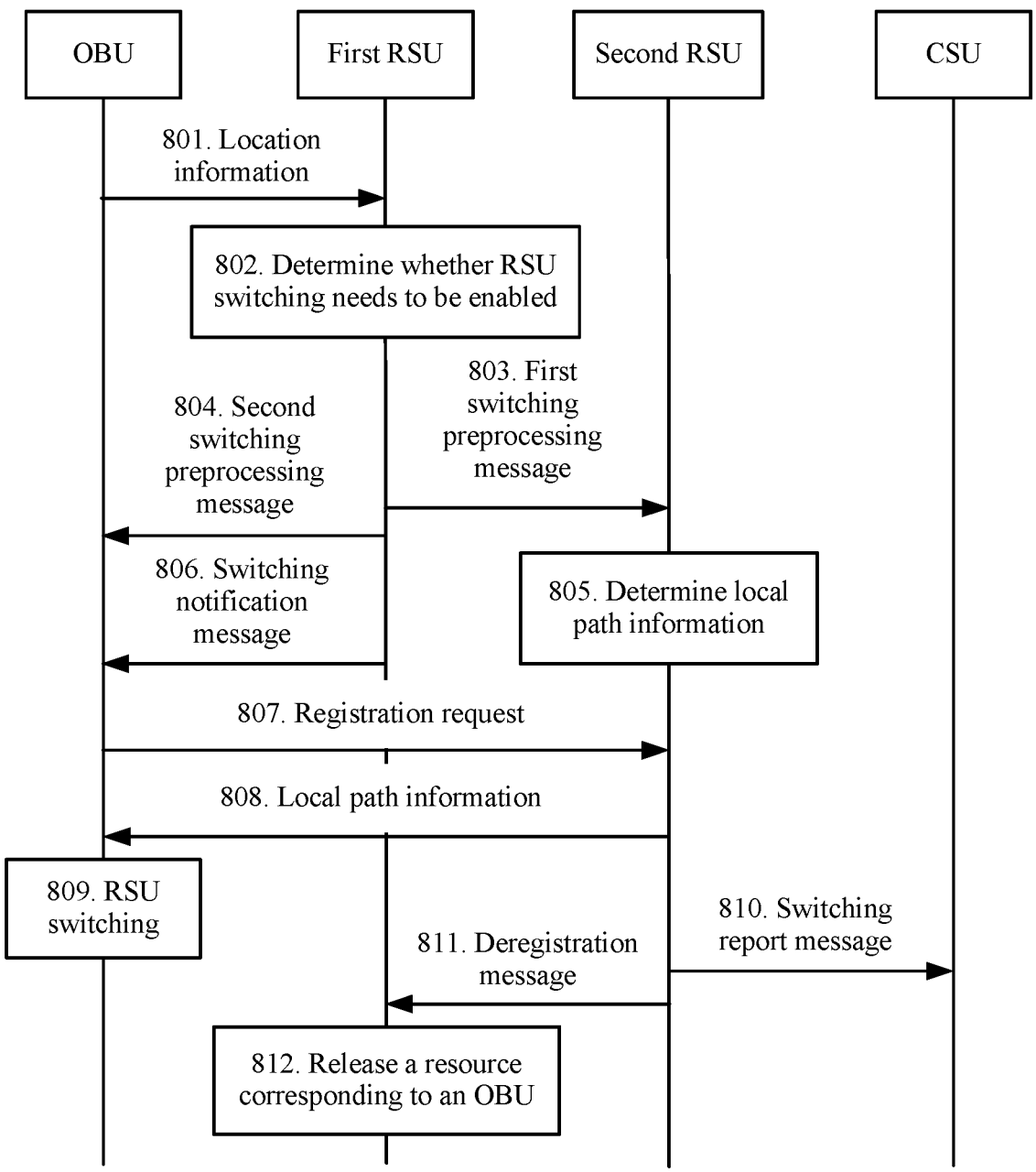
FIG. 4 is a schematic diagram of an interaction procedure of a method for switching a roadside navigation unit in a navigation system according to another embodiment of the present invention.

The following describes the embodiments of the present invention in detail with reference to FIG. 4. It should be noted that this is merely intended to help a person skilled in the art to better understand the embodiments of the present invention, but is not intended to limit the scope of the embodiments of the present invention.

In another embodiment of the present invention, an OBU regularly reports location information to a first RSU, so that the first RSU determines a distance from the OBU to a border of a coverage area of a second RSU according to the location information of the OBU, so as to determine whether to enable RSU switching. When the first RSU determines that the OBU approaches a border area, the first RSU enables switching processing, and sends a first switching preprocessing message to the second RSU, so that the second RSU determines the local path information of the OBU within the coverage area of the second RSU according to the first switching preprocessing message. When the first RSU determines that the OBU enters the border area, the first RSU sends a switching notification message to the OBU, so that the OBU sends a registration request to the second RSU. When determining that the OBU successfully registers with the second RSU, the second RSU directly sends the local path information of the OBU within the coverage area of the second RSU to the OBU. The OBU receives the local path information sent by the second RSU, and switches a home RSU of the OBU from the first RSU to the second RSU according to the local path information. After determining that the OBU switches the home RSU of the OBU from the first RSU to the second RSU, the second RSU sends a switching report message to a CSU to notify the CSU that the OBU has switched the home RSU of the OBU to the second RSU. In addition, after determining that the OBU switches the home RSU of the OBU to the second RSU, the second RSU sends a deregistration message to the first RSU, so that after receiving the deregistration message, the first RSU releases a resource corresponding to the OBU.

FIG. 4 is a schematic diagram of an interaction procedure of a method for switching a roadside navigation unit in a navigation system according to another embodiment of the present invention. Meanings of various terms in this embodiment of the present invention are the same as those in the foregoing embodiments.

801. An OBU sends location information of the OBU to a first RSU.

802. The first RSU determines, according to the location information of the OBU, whether the OBU needs to enable RSU switching preprocessing.

The first RSU first determines a distance from the OBU to a border of a coverage area of a second RSU according to the location information of the OBU, so as to determine whether to enable RSU switching.

803. The first RSU sends a first switching preprocessing message to a second RSU, where the first switching preprocessing message includes a global path of the OBU and the location information of the OBU.

804. The first RSU sends a second switching preprocessing message to the OBU, where the second switching preprocessing message includes at least one of an identity ID of the second RSU, an address of the second RSU, or a name of the second RSU.

When determining to enable switching processing, the first RSU sends the first switching preprocessing message to the second RSU, and sends the second switching preprocessing message to the OBU at the same time; or may first send a first switching preprocessing message to the second RSU, and then send a second switching preprocessing message to the OBU; or first sends a second switching preprocessing message to the OBU, and then sends a first switching preprocessing message to the second RSU.

805. The second RSU determines local path information of the OBU within a coverage area of the second RSU according to the first switching preprocessing message.

806. The first RSU determines a distance from the OBU to a border of the coverage area of the second RSU according to the location information of the OBU, and when the OBU travels into a border area, the first RSU sends a switching notification message to the OBU.

807. After receiving the switching notification message, the OBU sends a registration request to the second RSU.

808. The second RSU sends the local path information to the OBU when determining that the OBU successfully registers.

809. The OBU switches a home RSU of the OBU from the first RSU to the second RSU according to the local path information.

810. After determining that the OBU switches the home RSU of the OBU from the first RSU to the second RSU, the second RSU sends a switching report message to a central service unit CSU, where the switching report message is used to notify the CSU that the home RSU of the OBU has been switched to the second RSU.

811. After determining that the OBU switches the home RSU of the OBU from the first RSU to the second RSU, the second RSU sends a deregistration message to the first RSU.

After determining that the OBU switches the home RSU of the OBU from the first RSU to the second RSU, that is, starting to take over the OBU, the second RSU may first send the deregistration message to the first RSU, or may first send the switching report message to the CSU, or may send the deregistration message to the first RSU and send the switching report message to the CSU at the same time.

812. The first RSU releases, according to the deregistration message, a resource corresponding to the OBU.

It should be understood that, for a specific indication manner of the foregoing corresponding information, refer to the foregoing embodiments. For brevity, details are not described herein again.

Therefore, according to the method for switching a roadside navigation unit in a navigation system in this embodiment of the present invention, a second RSU determines local path information of an OBU within a coverage area of the second RSU according to a first switching preprocessing message sent by a first RSU, and the OBU switches a home RSU of the OBU from the first RSU to the second RSU according to the local path information sent by the second RSU, so that the OBU can implement seamless switching of an RSU by means of negotiation between the first RSU and the second RSU, and driving security of a self-driving vehicle is accordingly ensured.

According to the method for switching a roadside navigation unit in a navigation system in this embodiment of the present invention, the seamless switching of the RSU can be completed by means of negotiation between the first RSU and the second RSU, and lane-level path planning in an entire journey can be implemented based on the seamless switching of the RSU. Therefore, design of a CSU and that of the RSU are simplified and running burden on the CSU and that on the RSU are alleviated.

It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

The methods for switching a roadside navigation unit in a navigation system according to the embodiments of the present invention are described in detail above, and the following describes an OBU, a first RSU, and a second RSU according to the embodiments of the present invention.

Figure 5:
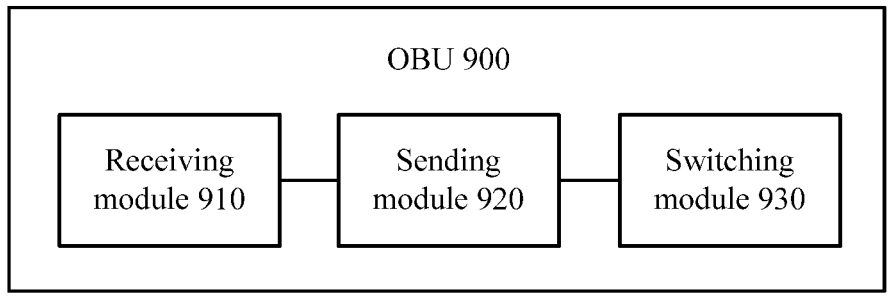
FIG. 5 is a schematic block diagram of an OBU according to an embodiment of the present invention.

FIG. 5 is a schematic block diagram of an OBU 900 according to an embodiment of the present invention. As shown in FIG. 5, the OBU 900 includes a receiving module 910, a sending module 920, and a switching module 930.

The receiving module 910 is configured to receive a switching notification message sent by a first RSU. The switching notification message is used to instruct the OBU to prepare to switch a home RSU of the OBU from the first RSU to a second RSU.

The sending module 920 is configured to send a registration request to the second RSU to request to obtain local path information of the OBU within a coverage area of the second RSU.

The receiving module 910 is further configured to receive the local path information sent by the second RSU.

The switching module 930 is configured to switch the home RSU of the OBU from the first RSU to the second RSU according to the local path information received by the receiving module 910.

Optionally, in this embodiment of the present invention, the sending module 920 is further configured to send location information of the OBU to the first RSU before the OBU receives the switching notification message sent by the first RSU. The location information is used by the first RSU to determine whether to enable RSU switching for the OBU, so as to determine whether to send the switching notification message.

In this embodiment of the present invention, optionally, the first switching preprocessing message includes a global path of the OBU and the location information of the OBU.

Optionally, in this embodiment of the present invention, the receiving module 910 is further configured to: before the OBU receives the switching notification message sent by the first RSU, receive a second switching preprocessing message sent by the first RSU. The second switching preprocessing message includes at least one of an identity ID of the second RSU, an address of the second RSU, or a name of the second RSU.

Optionally, in this embodiment of the present invention, the sending module 920 is further configured to:

receive a registration success message sent by the second RSU;

send a local path request to the second RSU according to the registration success message; and receive the local path information that is sent by the second RSU and that responds to the local path request.

In this embodiment of the present invention, optionally, the receiving module 910 is specifically configured to:

receive the local path information sent by the second RSU when the second RSU determines that the OBU successfully registers.

Optionally, in this embodiment of the present invention, the sending module 920 is further configured to send a switching report message to a central service unit CSU. The switching report message is used to notify the CSU that the home RSU of the OBU has been switched to the second RSU.

In this embodiment of the present invention, optionally, the sending module 920 is further configured to send a deregistration message to the first RSU, so that the first RSU releases, according to the deregistration message, a resource corresponding to the OBU.

The device 900 according to this embodiment of the present invention may be corresponding to the OBU in the methods for switching a roadside navigation unit in a navigation system according to the embodiments of the present invention, and the foregoing and other operations and/or functions of the modules in the device 900 are separately used to implement corresponding procedures of the methods above. For brevity, details are not described herein again.

Therefore, according to the OBU in a navigation system in this embodiment of the present invention, a second RSU determines local path information of an OBU within a coverage area of the second RSU according to a first switching preprocessing message sent by a first RSU, and the OBU switches a home RSU of the OBU from the first RSU to the second RSU according to the local path information sent by the second RSU, so that the OBU can implement seamless switching of an RSU by means of negotiation between the first RSU and the second RSU, and driving security of a self-driving vehicle is accordingly ensured.

According to the OBU in a navigation system in this embodiment of the present invention, the seamless switching of the RSU can be completed via negotiation between the first RSU and the second RSU, and lane-level path planning in an entire journey can be implemented based on the seamless switching of the RSU. Therefore, design of a CSU and that of the RSU are simplified and running burden on the CSU and that on the RSU are alleviated.

Figure 6:
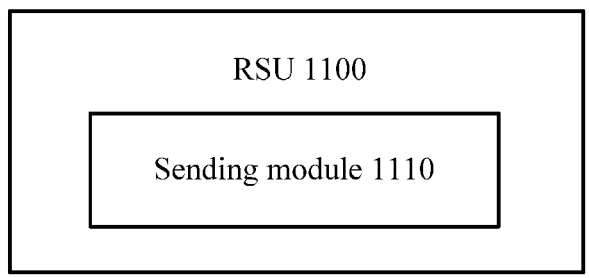
FIG. 6 is a schematic block diagram of an RSU according to another embodiment of the present invention.

FIG. 6 is a schematic block diagram of an RSU 1100 according to an embodiment of the present invention. As shown in FIG. 6, the RSU 1100 includes:

a sending module 1110, configured to send a first switching preprocessing message to a second RSU, so that the second RSU determines local path information of the onboard unit OBU within a coverage area of the second RSU according to the first switching preprocessing message.

The sending module 1110 is further configured to send a switching notification message to the OBU, where the switching notification message is used to instruct the OBU to prepare to switch a home RSU of the OBU from the RSU to the second RSU, so that the OBU, according to the switching notification message, obtains the local path information from the second RSU and switches the home RSU of the OBU from the RSU to the second RSU.

Optionally, in this embodiment of the present invention, the RSU 1100 further includes:

a receiving module, configured to: before the RSU sends the first switching preprocessing message to the second RSU, receive location information of the OBU that is sent by the OBU; and a determining module, configured to determine, according to the location information of the OBU, whether RSU switching is to be enabled for the OBU, so as to determine whether the switching notification message is to be sent or determine whether the first switching preprocessing message is to be sent.

In this embodiment of the present invention, optionally, the first switching preprocessing message includes a global path of the OBU and the location information of the OBU.

In this embodiment of the present invention, optionally, the sending module 1110 is further configured to send a second switching preprocessing message to the OBU before the RSU sends the switching notification message to the OBU. The second switching preprocessing message includes at least one of an identity ID of the second RSU, an address of the second RSU, or a name of the second RSU.

Optionally, the receiving module is further configured to receive a deregistration message sent by the OBU or the second RSU.

A deregistration module is configured to release, according to the deregistration message, a resource corresponding to the OBU.

Therefore, according to the RSU in a navigation system in this embodiment of the present invention, a second RSU determines local path information of an OBU within a coverage area of the second RSU according to a first switching preprocessing message sent by a first RSU, and the OBU switches a home RSU of the OBU from the first RSU to the second RSU according to the local path information sent by the second RSU, so that the OBU can implement seamless switching of an RSU by means of negotiation between the first RSU and the second RSU, and driving security of a self-driving vehicle is accordingly ensured.

According to the RSU in a navigation system in this embodiment of the present invention, the seamless switching of the RSU can be completed by means of negotiation between the first RSU and the second RSU, and lane-level path planning in an entire journey can be implemented based on the seamless switching of the RSU. Therefore, design of a CSU and that of the RSU are simplified and running burden on the CSU and that on the RSU are alleviated.

The RSU 1100 according to this embodiment of the present invention may be corresponding to the first RSU in the methods for switching a roadside navigation unit in a navigation system according to the embodiments of the present invention, and the foregoing and other operations and/or functions of the modules in the RSU 1100 are separately used to implement corresponding procedures of the methods above. For brevity, details are not described herein again.

Figure 7:
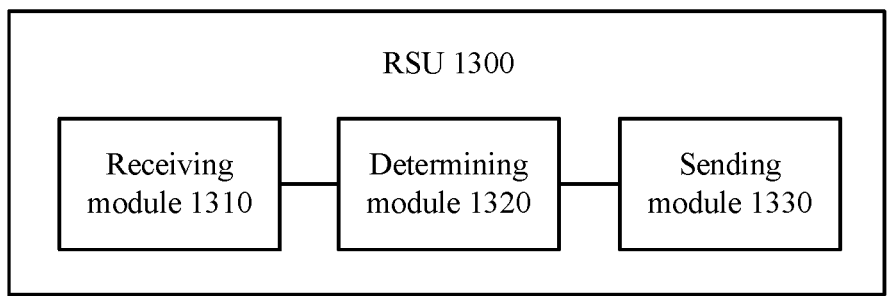
FIG. 7 is a schematic block diagram of an RSU according to still another embodiment of the present invention.

FIG. 7 is a schematic block diagram of an RSU 1300 according to an embodiment of the present invention. As shown in FIG. 7, the RSU 1300 includes a receiving module 1310, a determining module 1320, and a sending module 1330.

The receiving module 1310 is configured to receive a first switching preprocessing message sent by a first RSU;

The determining module 1320 is configured to determine local path information of an onboard unit OBU within a coverage area of the RSU according to the first switching preprocessing message.

The receiving module 1310 is further configured to receive a registration request that is sent by the OBU and that is used to request to obtain the local path information.

The sending module 1330 is configured to send the local path information to the OBU, so that the OBU switches a home RSU of the OBU from the first RSU to the RSU according to the local path information.

In this embodiment of the present invention, optionally, the sending module 1330 is further configured to send a registration success message to the OBU.

The receiving module 1310 is further configured to receive a local path request sent by the OBU according to the registration success message.

The sending module 1330 is specifically configured to:

send, to the OBU, the local path information that responds to the local path request.

Optionally, in this embodiment of the present invention, the sending module 1330 is configured to:

send the local path information to the OBU when it is determined that the OBU successfully registers.

In this embodiment of the present invention, optionally, the first switching preprocessing message includes a global path of the OBU and location information of the OBU.

Optionally, in this embodiment of the present invention, the sending module 1330 is further configured to send a switching report message to a central service unit CSU. The switching report message is used to notify the CSU that the home RSU of the OBU has been switched to the RSU.

In this embodiment of the present invention, optionally, the sending module 1330 is further configured to send a deregistration message to the first RSU, so that the first RSU releases, according to the deregistration message, a resource corresponding to the OBU.

Therefore, according to the RSU in a navigation system in this embodiment of the present invention, a second RSU determines local path information of an OBU within a coverage area of the second RSU according to a first switching preprocessing message sent by a first RSU, and the OBU switches a home RSU of the OBU from the first RSU to the second RSU according to the local path information sent by the second RSU, so that the OBU can implement seamless switching of an RSU by means of negotiation between the first RSU and the second RSU, and driving security of a self-driving vehicle is accordingly ensured.

According to the RSU in a navigation system in this embodiment of the present invention, the seamless switching of the RSU can be completed via negotiation between the first RSU and the second RSU, and lane-level path planning in an entire journey can be implemented based on the seamless switching of the RSU. Therefore, design of a CSU and that of the RSU are simplified and running burden on the CSU and that on the RSU are alleviated.

The RSU 1300 according to this embodiment of the present invention may be corresponding to the second RSU in the methods for switching a roadside navigation unit in a navigation system according to the embodiments of the present invention, and the foregoing and other operations and/or functions of the modules in the RSU 1300 are separately used to implement corresponding procedures of the methods above. For brevity, details are not described herein again.

Figure 8:
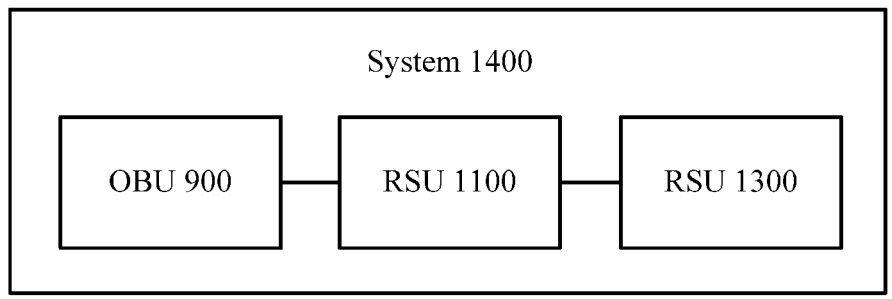
FIG. 8 is a schematic block diagram of a system according to an embodiment of the present invention.

An embodiment of the present invention further provides a system. As shown in FIG. 8, a system 1400 includes:

the OBU 900 according to the foregoing embodiment of the present invention, the RSU 1100 according to the foregoing embodiment of the present invention, and the RSU 1300 according to the foregoing embodiment of the present invention.

Figure 9:
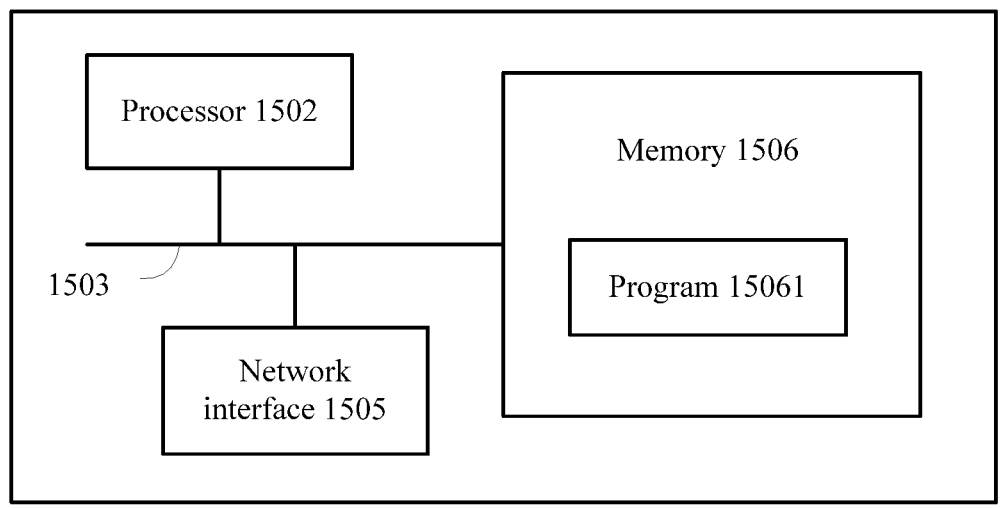
FIG. 9 is a schematic structural diagram of an OBU according to an embodiment of the present invention.

FIG. 9 shows a structure of an OBU according to still another embodiment of the present invention. The OBU includes at least one processor 1502 (for example, a general purpose processor (central processing unit, CPU) with a computing and processing capability, a digital signal processor (DSP), an application-specific integrated circuit (ASIC), or a field programmable gate array (FPGA)). The processor manages and schedules modules and components in the OBU. The OBU further includes at least one network interface 1505 or another communications interface, a memory 1506, and at least one bus system 1503. The components in the OBU are coupled together by using the bus system 1503. The bus system 1503 may include a data bus, a power bus, a control bus, a status signal bus, and the like. For clarity of description, various buses are marked as the bus system 1503 in the figure.

The method disclosed in the embodiment of the present invention may be applied to the processor 1502, or may be used to execute an executable module stored in the memory 1506, for example, a computer program. The memory 1506 may include a high-speed random access memory (RAM, Random Access Memory), or may include a non-volatile memory (non-volatile memory). The memory may include a read-only memory and a random access memory, and provide required signaling or data, a required program, and the like for the processor. A part of the memory may further include a non-volatile random access memory (NVRAM). A communication connection between the memory and at least one other network element is implemented by using the at least one network interface 1505 (which may be wired or wireless).

In some implementations, the memory 1506 stores a program 15061, and the processor 1502 performs the program 15061 to perform some operations:

receiving, by using the network interface 1505, a switching notification message sent by a first roadside navigation unit RSU, where the switching notification message is used to instruct the onboard unit OBU to prepare to switch a home RSU of the OBU from the first RSU to a second RSU;

sending a registration request to the second RSU by using the network interface 1505;

receiving, by using the network interface 1505, local path information that is of the OBU within a coverage area of the second RSU and sent by the second RSU according to the registration request, where the local path information is determined by the second RSU according to a first switching preprocessing message sent by the first RSU; and switching the home RSU of the OBU from the first RSU to the second RSU according to the local path information.

It should be noted that, the OBU may be specifically the OBU in the foregoing embodiments, and may be configured to perform steps and/or procedures corresponding to the OBU in the foregoing method embodiments.

It can be learned from the technical solution provided in this embodiment of the present invention that, a second RSU determines local path information of an OBU within a coverage area of the second RSU according to a first switching preprocessing message sent by a first RSU, and the OBU switches a home RSU of the OBU from the first RSU to the second RSU according to the local path information sent by the second RSU, so that the OBU can implement seamless switching of an RSU by means of negotiation between the first RSU and the second RSU, and driving security of a self-driving vehicle is accordingly ensured.

According to this embodiment of the present invention, the seamless switching of the RSU can be completed by means of negotiation between the first RSU and the second RSU, and lane-level path planning in an entire journey can be implemented based on the seamless switching of the RSU. Therefore, design of a CSU and that of the RSU are simplified and running burden on the CSU and that on the RSU are alleviated.

Figure 10:
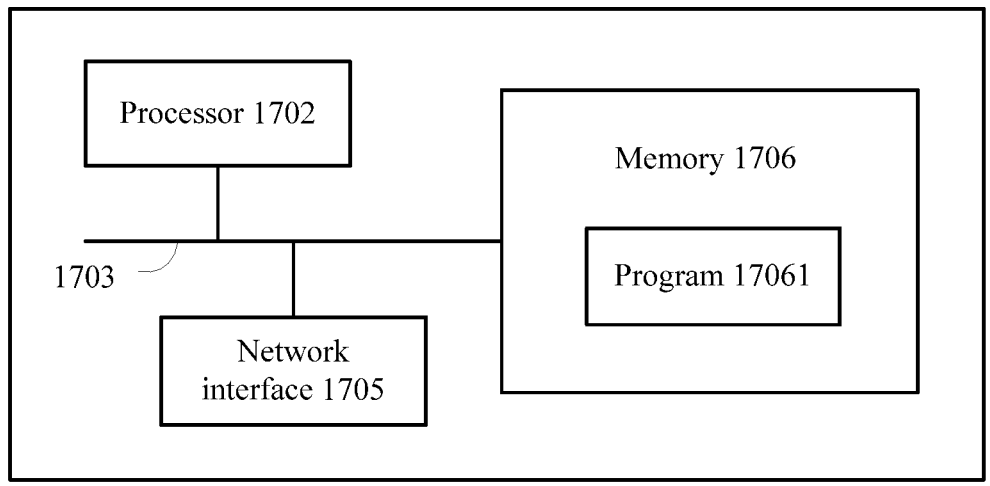
FIG. 10 is a schematic structural diagram of an RSU according to another embodiment of the present invention.

FIG. 10 shows a structure of a roadside navigation unit RSU according to still another embodiment of the present invention. The RSU includes at least one processor 1702 (for example, a general purpose processor or CPU with a computing and processing capability, a digital signal processor (DSP), an application-specific integrated circuit (ASIC), or a field programmable gate array (FPGA)). The processor manages and schedules modules and components in the OBU. The RSU further includes at least one network interface 1705 or another communications interface, a memory 1706, and at least one bus system 1703. The components in the OBU are coupled together by using the bus system 1703. The bus system 1703 may include a data bus, a power bus, a control bus, a status signal bus, and the like. For clarity of description, various buses are marked as the bus system 1703 in the figure.

The method disclosed in the embodiment of the present invention may be applied to the processor 1702, or may be used to execute an executable module stored in the memory 1706, for example, a computer program. The memory 1706 may include a high-speed random access memory (RAM, Random Access Memory), or may include a non-volatile memory (non-volatile memory). The memory may include a read-only memory and a random access memory, and provide required signaling or data, a required program, and the like for the processor. A part of the memory may further include a non-volatile random access memory (NVRAM). A communication connection between the memory and at least one other network element is implemented by using the at least one network interface 1705 (which may be wired or wireless).

In some implementations, the memory 1706 stores a program 17061, and the processor 1702 performs the program 17061 to perform some operations:

sending a first switching preprocessing message to a second roadside navigation unit RSU by using the network interface 1705, where the first switching preprocessing message is used by the second RSU to determine local path information of an onboard unit OBU within a coverage area of the second RSU; and sending a switching notification message to the OBU by using the network interface 1705, where the switching notification message is used to instruct the OBU to prepare to switch a home RSU of the OBU from the RSU to the second RSU, so that the OBU, according to the switching notification message, obtains the local path information from the second RSU and switches the home RSU of the OBU from the RSU to the second RSU.

It should be noted that, the RSU may be specifically the first RSU in the foregoing embodiments, and may be configured to perform steps and/or procedures corresponding to the first RSU in the foregoing method embodiments.

It can be learned from the technical solution provided in this embodiment of the present invention that, a second RSU determines local path information of an OBU within a coverage area of the second RSU according to a first switching preprocessing message sent by a first RSU, and the OBU switches a home RSU of the OBU from the first RSU to the second RSU according to the local path information sent by the second RSU, so that the OBU can implement seamless switching of an RSU by means of negotiation between the first RSU and the second RSU, and driving security of a self-driving vehicle is accordingly ensured.

According to this embodiment of the present invention, the seamless switching of the RSU can be completed by means of negotiation between the first RSU and the second RSU, and lane-level path planning in an entire journey can be implemented based on the seamless switching of the RSU. Therefore, design of a CSU and that of the RSU are simplified and running burden on the CSU and that on the RSU are alleviated.

Figure 11:
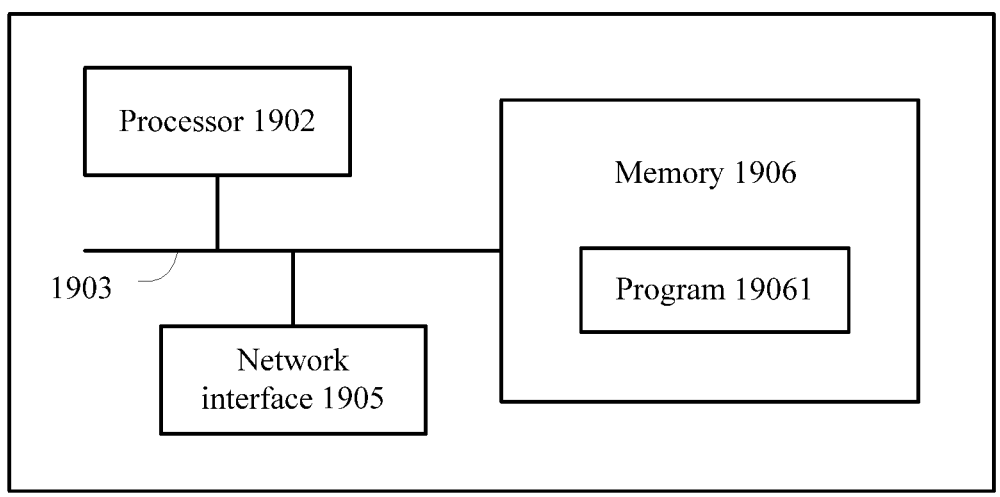
FIG. 11 is a schematic structural diagram of an RSU according to still another embodiment of the present invention.

FIG. 11 shows a structure of an RSU according to still another embodiment of the present invention. The RSU includes at least one processor 1902 (for example, a general purpose processor such as a CPU with a computing and processing capability, a digital signal processor (DSP), an application-specific integrated circuit (ASIC), or a field programmable gate array (FPGA)). The processor manages and schedules modules and components in an OBU. The RSU further includes at least one network interface 1905 or another communications interface, a memory 1906, and at least one bus system 1903. The components in the OBU are coupled together by using the bus system 1903. The bus system 1903 may include a data bus, a power bus, a control bus, a status signal bus, and the like. For clarity of description, various buses are marked as the bus system 1903 in the figure.

The method disclosed in the embodiment of the present invention may be applied to the processor 1902, or may be used to execute an executable module stored in the memory 1906, for example, a computer program. The memory 1906 may include a high-speed random access memory (RAM, Random Access Memory), or may include a non-volatile memory (non-volatile memory). The memory may include a read-only memory and a random access memory, and provide required signaling or data, a required program, and the like for the processor. A part of the memory may further include a non-volatile random access memory (NVRAM). A communication connection between the memory and at least one other network element is implemented by using the at least one network interface 1905 (which may be wired or wireless).

In some implementations, the memory 1906 stores a program 19061, and the processor 1902 performs the program 19061 to perform some operations:

receiving, by using the network interface 1905, a first switching preprocessing message sent by a first roadside navigation unit RSU;

determining local path information of an onboard unit OBU within a coverage area of the RSU according to the first switching preprocessing message;

receiving, by using the network interface 1905, a registration request sent by the OBU; and sending the local path information to the OBU by using the network interface 1905, so that the OBU switches a home RSU of the OBU from the first RSU to the RSU according to the local path information.

It should be noted that, the RSU may be specifically the second RSU in the foregoing embodiments, and may be configured to perform steps and/or procedures corresponding to the second RSU in the foregoing method embodiments.

It can be learned from the technical solution provided in this embodiment of the present invention that, a second RSU determines local path information of an OBU within a coverage area of the second RSU according to a first switching preprocessing message sent by a first RSU, and the OBU switches a home RSU of the OBU from the first RSU to the second RSU according to the local path information sent by the second RSU, so that the OBU can implement seamless switching of an RSU by means of negotiation between the first RSU and the second RSU, and driving security of a self-driving vehicle is accordingly ensured.

According to this embodiment of the present invention, the seamless switching of the RSU can be completed by means of negotiation between the first RSU and the second RSU, and lane-level path planning in an entire journey can be implemented based on the seamless switching of the RSU. Therefore, design of a CSU and that of the RSU are simplified and running burden on the CSU and that on the RSU are alleviated.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the described system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, that is, may be located in one position, or may be distributed on multiple network units. Some or all of the units may be selected according to actual requirements to achieve the objectives of the solutions of the embodiments.

In addition, functional units in the embodiments of the present invention may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of the present invention. The foregoing storage medium includes any medium that can store program code, such as a USB flash drive, a removable hard disk, a read-only memory (ROM), a random access memory (RAM), a magnetic disk, or an optical disc.

What is claimed is:

1. A method for switching a roadside navigation unit (RSU) in a navigation system, the method comprising:
  receiving, by an onboard unit (OBU), a switching notification message from a first RSU, wherein the switching notification message is used to instruct the OBU to prepare to switch a home RSU of the OBU from the first RSU to a second RSU;
  sending, by the OBU, a registration request to the second RSU to request to obtain local path information of the OBU within a coverage area of the second RSU;
  receiving, by the OBU, the local path information from the second RSU; and
  switching, by the OBU, the home RSU of the OBU from the first RSU to the second RSU according to the local path information.

2. The method according to claim 1, wherein before the receiving, by an OBU, a switching notification message from the first RSU, the method further comprises:
  sending, by the OBU, location information of the OBU to the first RSU, wherein the location information is used by the first RSU to determine whether to enable RSU switching for the OBU, so as to determine whether to send the switching notification message.

3. The method according to claim 1, wherein the sending, by the OBU, a registration request to the second RSU to request to obtain local path information of the OBU within a coverage area of the second RSU comprises:
  receiving, by the OBU, a registration success message from the second RSU;
  sending, by the OBU, a local path request to the second RSU in response to the registration success message; and
  receiving, by the OBU, the local path information from the second RSU in response to the local path request.

4. The method according to claim 1, further comprising:
  sending, by the OBU, a switching report message to a central service unit (CSU), wherein the switching report message is used to notify the CSU that the home RSU of the OBU has been switched to the second RSU.

5. A method for switching a roadside navigation unit (RSU) in a navigation system, the method comprising:
  sending, by a first RSU, a first switching preprocessing message to a second RSU, wherein the first switching preprocessing message is used by the second RSU to determine local path information of an onboard unit (OBU) within a coverage area of the second RSU; and
  sending, by the first RSU, a switching notification message to the OBU, wherein the switching notification message is used to instruct the OBU to prepare to switch a home RSU of the OBU from the first RSU to the second RSU, so that the OBU, according to the switching notification message, obtains the local path information from the second RSU and switches the home RSU of the OBU from the first RSU to the second RSU.

6. The method according to claim 5, further comprising:
  receiving, by the first RSU, location information of the OBU from the OBU; and
  determining, by the first RSU according to the location information of the OBU, whether to enable RSU switching for the OBU, so as to determine whether to send the switching notification message or determine whether to send the first switching preprocessing message.

7. The method according to claim 5, wherein before the sending, by the first RSU, a switching notification message to the OBU, the method further comprises:
  sending, by the first RSU, a second switching preprocessing message to the OBU, wherein the second switching preprocessing message comprises at least one of an identity ID of the second RSU, an address of the second RSU, or a name of the second RSU.

8. A method for switching a roadside navigation unit (RSU) in a navigation system, the method comprising:
  receiving, by a second RSU, a first switching preprocessing message from a first RSU;
  determining, by the second RSU, local path information of an onboard unit (OBU) within a coverage area of the second RSU according to the first switching preprocessing message;
  receiving, by the second RSU, a registration request from the OBU, which is used to request to obtain the local path information; and
  sending, by the second RSU, the local path information to the OBU, so that the OBU switches a home RSU of the OBU from the first RSU to the second RSU according to the local path information.

9. The method according to claim 8, further comprising:
sending, by the second RSU, a registration success message to the OBU; and
receiving, by the second RSU, a local path request from the OBU in response to the registration success message,
wherein sending, by the second RSU, the local path information to the OBU comprises:
sending, by the second RSU to the OBU, the local path information in response to the local path request.

10. The method according to claim 8, further comprising:
sending, by the second RSU, a switching report message to a central service unit (CSU), wherein the switching report message is used to notify the CSU that the home RSU of the OBU has been switched to the second RSU.

11. An onboard unit (OBU), comprising:
a receiving module configured to receive a switching notification message from a first roadside navigation unit (RSU), wherein the switching notification message is used to instruct the OBU to prepare to switch a home RSU of the OBU from the first RSU to a second RSU;
a sending module configured to send a registration request to the second RSU to request to obtain local path information of the OBU within a coverage area of the second RSU, wherein the receiving module is further configured to receive the local path information from the second RSU; and
a switching module configured to switch the home RSU of the OBU from the first RSU to the second RSU according to the local path information received by the receiving module.

12. The OBU according to claim 11, wherein the sending module is further configured to send location information of the OBU to the first RSU before the OBU receives the switching notification message from the first RSU, wherein the location information is used by the first RSU to determine whether to enable RSU switching for the OBU, so as to determine whether to send the switching notification message.

13. The OBU according to claim 11, wherein the receiving module is further configured to:
receive a registration success message from the second RSU; and
the receiving module is further configured to send a local path request to the second RSU according to the registration success message; and
receive the local path information from the second RSU in response to the local path request.

14. The OBU according to claim 11, wherein the sending module is further configured to:
send a switching report message to a central service unit (CSU), wherein the switching report message is used to notify the CSU that the home RSU of the OBU has been switched to the second RSU.

15. A roadside navigation unit (RSU), comprising:
a sending module configured to send a first switching preprocessing message to a second RSU, wherein the first switching preprocessing message is used by the second RSU to determine local path information of an onboard unit (OBU) within a coverage area of the second RSU, wherein
the sending module is further configured to send a switching notification message to the OBU, wherein the switching notification message is used to instruct the OBU to prepare to switch a home RSU of the OBU from the RSU to the second RSU, so that the OBU, according to the switching notification message, obtains the local path information from the second RSU and switches the home RSU of the OBU from the RSU to the second RSU.

16. The RSU according to claim 15, further comprising:
a receiving module configured to, before the RSU sends the first switching preprocessing message to the second RSU, receive location information of the OBU from the OBU; and
a determining module configured to determine, according to the location information of the OBU, whether RSU switching is to be enabled for the OBU, so as to determine whether the switching notification message is to be sent or determine whether the first switching preprocessing message is to be sent.

17. The RSU according to claim 15, wherein the sending module is further configured to send a second switching preprocessing message to the OBU before the RSU sends the switching notification message to the OBU, wherein the second switching preprocessing message comprises at least one of an identity ID of the second RSU, an address of the second RSU, or a name of the second RSU.

18. A roadside navigation unit (RSU), comprising:
a receiving module configured to receive a first switching preprocessing message from a first RSU;
a determining module configured to determine local path information of an onboard unit (OBU) within a coverage area of the RSU according to the first switching preprocessing message, wherein the receiving module is further configured to receive a registration request from the OBU, which is used to request to obtain the local path information; and
a sending module configured to send the local path information to the OBU, so that the OBU switches a home RSU of the OBU from the first RSU to the RSU according to the local path information.

19. The RSU according to claim 18, wherein the sending module is further configured to send a registration success message to the OBU,
wherein the receiving module is further configured to receive a local path request from the OBU according to the registration success message, and
wherein the sending module is configured to send, to the OBU, the local path information in response to the local path request.

20. The RSU according to claim 18, wherein the sending module is further configured to send a switching report message to a central service unit (CSU), wherein the switching report message is used to notify the CSU that the home RSU of the OBU has been switched to the RSU.

\* \* \* \* \*